United States Patent
Newman et al.

(10) Patent No.: US 12,282,107 B2
(45) Date of Patent: *Apr. 22, 2025

(54) RAPID, AUTOMATIC DIRECTIONAL BEAM ALIGNMENT IN 5G/6G NETWORKS

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,104

(22) Filed: Jun. 11, 2024

(65) Prior Publication Data

US 2024/0369668 A1    Nov. 7, 2024

Related U.S. Application Data

(63) Continuation of application No. 18/458,849, filed on Aug. 30, 2023, now Pat. No. 12,038,519, which is a continuation of application No. 17/897,657, filed on Aug. 29, 2022, now Pat. No. 11,782,119.

(60) Provisional application No. 63/399,762, filed on Aug. 22, 2022.

(51) Int. Cl.
| | |
|---|---|
| *G01S 3/72* | (2006.01) |
| *H04B 17/24* | (2015.01) |
| *G01S 3/04* | (2006.01) |
| *G01S 3/64* | (2006.01) |
| *H04B 17/27* | (2015.01) |

(52) U.S. Cl.
CPC .............. *G01S 3/72* (2013.01); *H04B 17/24* (2015.01); *G01S 3/043* (2013.01); *G01S 3/64* (2013.01); *H04B 17/27* (2015.01)

(58) Field of Classification Search
CPC ... G01S 3/043; G01S 3/64; G01S 3/66; G01S 3/72; H04B 17/27; H04B 17/24
USPC ......................................... 342/367, 421, 442
See application file for complete search history.

(56) References Cited

U.S. PATENT DOCUMENTS

| | | | |
|---|---|---|---|
| 6,593,880 | B2 | 7/2003 | Velazquez |
| 7,373,127 | B2 | 5/2008 | Reed |
| 10,708,918 | B2 | 7/2020 | Negus |
| 11,483,053 | B2 | 10/2022 | Kapetanovic |
| 11,510,276 | B2 | 11/2022 | Su |

(Continued)

FOREIGN PATENT DOCUMENTS

WO    2017184190    10/2017

*Primary Examiner* — Chuong P Nguyen

(57) ABSTRACT

Beam alignment is a critical requirement in 5G-Advanced and 6G due to the high density of user devices anticipated in the coming years. However, prior-art beam alignment procedures are slow and costly in terms of resource usage. Therefore, disclosed herein are methods enabling a user device to determine the direction toward the base station rapidly at very low cost. The base station emits a tailored pulse with an angle-dependent phase, varying from a first phase at a first angle, to a second phase at a second angle, followed by a uniform-phase calibrator pulse. The user device can measure the as-received phase of the tailored pulse relative to the calibrator pulse, and thereby determine the user's direction relative to the base station. The user device can then inform the base station of the received phase, which is proportional to the angle. Both user and base station thereby obtain instant beam alignment.

20 Claims, 7 Drawing Sheets

(56) References Cited

U.S. PATENT DOCUMENTS

| | | | |
|---|---|---|---|
| 11,552,718 B2 | 1/2023 | Abedini | |
| 11,644,522 B2* | 5/2023 | Newman | G01S 3/06 |
| | | | 375/267 |
| 11,811,482 B2* | 11/2023 | Xia | G01S 5/0284 |
| 2002/0147032 A1 | 10/2002 | Yoon | |
| 2003/0125046 A1 | 7/2003 | Riley | |
| 2010/0124212 A1 | 5/2010 | Lo | |
| 2011/0238286 A1 | 9/2011 | Roesser | |
| 2019/0364390 A1 | 11/2019 | Kurras | |
| 2020/0112360 A1 | 4/2020 | Krunz | |
| 2021/0007173 A1 | 1/2021 | Su | |
| 2021/0203398 A1 | 7/2021 | Kapetanovic | |
| 2021/0273714 A1 | 9/2021 | Lee | |
| 2021/0306870 A1* | 9/2021 | Lee | H04W 24/10 |
| 2021/0336686 A1 | 10/2021 | Rune | |
| 2021/0351835 A1 | 11/2021 | Woo | |
| 2022/0006505 A1 | 1/2022 | Ryu | |
| 2022/0018925 A1 | 1/2022 | Duan | |
| 2022/0141678 A1* | 5/2022 | Newman | H04W 52/08 |
| | | | 370/329 |
| 2022/0240309 A1* | 7/2022 | Sakhnini | H04L 5/0023 |
| 2023/0028819 A1* | 1/2023 | Newman | H04B 7/088 |
| 2023/0178891 A1* | 6/2023 | Newman | H01Q 1/246 |
| | | | 342/372 |
| 2023/0283322 A1* | 9/2023 | Newman | H04W 52/225 |
| | | | 370/329 |
| 2024/0045013 A1* | 2/2024 | Newman | G01S 3/02 |

* cited by examiner

RAPID, AUTOMATIC DIRECTIONAL BEAM ALIGNMENT IN 5G/6G NETWORKS

PRIORITY CLAIMS AND RELATED APPLICATIONS

This application is a continuation of U.S. patent application Ser. No. 18/458,849, entitled "Low-Complexity Beam Alignment by Directional Phase in 5G and 6G", filed Aug. 30, 2023, which is a continuation of U.S. patent application Ser. No. 17/897,657, entitled "Phased Beam-Alignment Pulse for Rapid Localization in 5G and 6G", filed Aug. 29, 2022, which claims the benefit of U.S. Provisional Patent Application Ser. No. 63/399,762, entitled "Phased Beam-Alignment Pulse for Rapid Localization in 5G and 6G", filed Aug. 22, 2022, all of which are hereby incorporated by reference in their entireties.

FIELD OF THE INVENTION

The disclosure pertains to wireless beamforming, and more particularly to means for selecting an optimum beam direction.

BACKGROUND OF THE INVENTION

In 5G and 6G, many communications are carried out using "beams" or directed radiation, aimed at the intended recipient. However, a complex time-consuming procedure is required to align the beams in the right directions. What is needed is a simpler, more efficient procedure for determining an optimal beam direction for each recipient.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a first wireless entity to determine an alignment angle toward a second wireless entity, the method comprising: transmitting, by the first wireless entity, a first pulse configured to span an angular range between a first angle and a second angle, wherein the first pulse is phase modulated according to a first phase value at the first angle and a second phase value at the second angle, and wherein the phase varies monotonically from the first phase value at the first angle to the second phase value at the second angle; receiving, from the second wireless entity, a message indicating a measured phase value; and calculating the alignment angle toward the second wireless entity, according to the first and second angles, the first and second phase values, and the measured phase value.

In another aspect, there is non-transitory computer-readable media in a first wireless entity of a wireless network, the non-transitory computer-readable media containing instructions that, when executed by a computing environment, cause a method to be performed for determining an alignment angle toward a second wireless entity, the method comprising: transmitting a first pulse of electromagnetic energy spanning 360 degrees of angle around the first entity; wherein the first pulse is configured to have a phase value that varies by 360 degrees of phase as the angle is varied by 360 degrees of angle around the first wireless entity; and wherein the phase value varies monotonically with angle.

In another aspect, there is a method for a second wireless entity to determine a direction toward a first wireless entity, the method comprising: receiving a first pulse comprising electromagnetic energy, the first pulse transmitted by the first wireless entity; measuring a received phase of the first pulse as-received by the second wireless entity; transmitting a reply message to the first wireless entity, the reply message indicating the received phase; and receiving a data message from the first wireless entity indicating the direction toward the first wireless entity.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
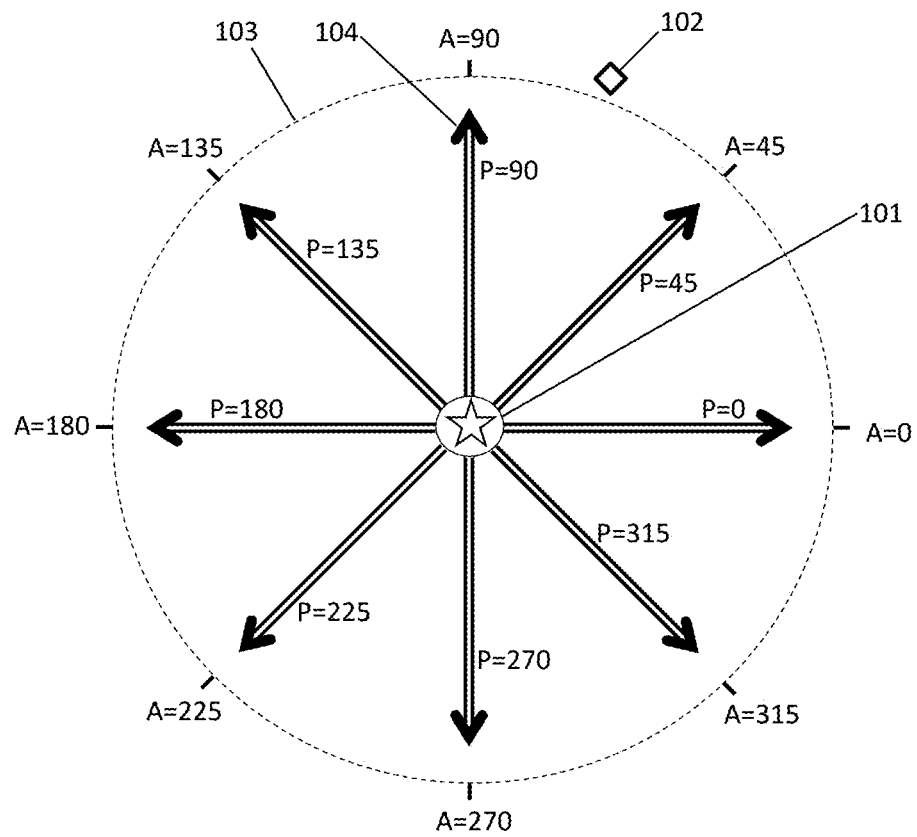
FIG. 1A is a schematic showing an exemplary embodiment of a phased beam-alignment pulse, according to some embodiments.

Systems and methods disclosed herein (the "systems" and "methods", also occasionally termed "embodiments" or "arrangements" or "versions", generally according to present principles) can provide urgently needed wireless communication protocols for aligning transmission beams and directional reception antennas to improve communication quality. Instead of wasting time and resources on prior-art multi-step beam alignment procedures, the procedures disclosed herein can enable a transmitter and a receiver to cooperatively select the best beam direction at both ends, using "phased beam-alignment pulses". A phased beam-alignment pulse, as used herein, is a pulse of electromagnetic energy configured to have a first phase in a first direction and a second phase in a second direction, with the phase varying monotonically between the two directions.

In a first version (the "phased beam-alignment transmission pulse" version), a transmitter antenna with beamforming capability may be energized and phased to transmit a pulse that has a range of different phase values in a range of different directions. For example, the pulse may have a first phase in a first direction and a second phase in a second direction, and the phase may be varied monotonically between the two directions. A receiver, at some unknown angle between the first and second directions, and can measure the phase of the as-received pulse signal. The received phase depends on the direction toward the receiver; hence the receiver can calculate its alignment direction toward the transmitter from the measured phase. By this method, the receiver can achieve beam alignment toward the transmitter, based on a single brief pulse in a single resource element. This is much faster and more resource-efficient than prior-art alignment procedures.

In some embodiments, the receiver may not know the first and second angles, in which case the receiver can measure the received phase of the beam-alignment pulse, and then transmit a message to the transmitter indicating the received phase. The transmitter can then calculate the alignment direction, and inform the receiver.

In a second version (the "phased beam-alignment reception pulse" version), the transmitter can transmit an ordinary non-directional pulse with uniform phase in a wide beam that includes the first and second directions. The transmitted phase is constant and independent of angle for this pulse. The receiver, on the other hand, can detect the pulse using a phased reception antenna. For example, the receiver can configure its antenna to impose a delay or phase advance that depends on the angle of arrival of the signal. The reception antenna may impose a first phase advance on signals arriving from a first direction, and a second phase advance on signals arriving from a second direction, and may cause the phase advance to vary monotonically with angle. The receiver can then detect the pulse signal and, using the antenna with angle-dependent phase advance, can measure the phase of the received signal. The receiver can then determine the alignment direction toward the transmitter according to the measured phase.

In both versions (phased transmission and phased reception), and other versions presented below, the alignment direction is determined while expending only a tiny fraction of the time and resources and transmission power required for prior-art beam-scanning alignment procedures.

Reciprocity is assumed throughout, in the sense that the same alignment angle is assumed optimal for both reception and transmission at a particular site. In many cases, the same alignment angle (modulo 180 degrees) is applicable to both of the communicating entities, although this is not a requirement. For simplicity, the optimal transmission and reception direction both communicating entities will be termed "the alignment angle" or "the alignment direction", unless otherwise specified, and the 180-degree difference between the two directions will be ignored.

Directions, and the angles representing them, are used interchangeably herein. A commonly shared geographical coordinate system, such as the direction of north, will be assumed unless otherwise indicated. The term "signal" may represent an amplitude, a power level, a power density, or other measure of transmitted or received beam intensity. The term "beam" has many closely-related usages, including directional transmitted energy, an angular distribution of the transmitted energy, received energy from a direction, and an angular distribution of the received energy, for example. Clarification will be provided in text when needed.

A potential confusion pertains to the term "degrees", which may refer to either phase or angle. To avoid confusion, "degrees of angle" and "degrees of phase" will be used herein, depending on the intended meaning.

The disclosed principles enable numerous options and variations, some of which follow. (a) The transmitter may transmit two phased beam-alignment pulses in succession, in which the phase versus angle is reversed in the second pulse. For example, in the first pulse the phase may be equal to the angle, and in the second pulse the phase may be equal to the negative of the angle. (b) Each phased beam-alignment pulse can be transmitted in a single resource element or, to convey additional information, in multiple resource elements. (c) Before transmitting the phased beam-alignment pulse, one of the entities can transmit a planning message to the other entity specifying the first and second directions, the specific symbol-times and subcarriers for transmission of the pulse(s), and whether the procedure is to use phased transmission beams or phased reception beams, among other parameters. In addition, the planning message, or other convention, can specify whether the phased beam-alignment pulses are to be ramped linearly in phase versus angle, or according to some other distribution of phase versus angle. (d) After both entities have aligned their transmission and reception beams toward the other entity, they can exchange acknowledgement messages to each other using narrow focused transmission and reception beams at the calculated alignment direction. The acknowledgement messages may additionally specify the alignment angle, the measured beam quality, suggested transmission power adjustments, and the like. (e) The transmitter may transmit a "calibrator" pulse before or after the phased beam-alignment pulse. The calibrator pulse is a wide-angle transmission with uniform phase between the first and second angles. The receiver can use the phase of the calibrator pulse as a baseline, for determining the phase of the subsequent phased beam-alignment pulse by comparison. A demodulation reference, or other transmission with a predetermined phase, may alternatively be used as the calibrator if it spans the same angular range as the phased beam-alignment pulse. (f) For additional angular resolution, the transmitter can transmit additional phased beam-alignment pulses with different relationships between phase and angle, such as a second pulse having a higher rate of change of phase versus angle, as well as additional pulses in which the phase-versus-angle slope is reversed. (g) After determining the alignment direction, one wireless entity may transmit an alignment message to the wireless entity indicating the alignment direction geographically, such as an angle relative to north. (h) In a network, multiple receivers can receive the same phased beam-alignment pulse, and can thereby determine their own alignment angles at the same time. For example, a base station can transmit a phased beam-alignment pulse in which the phase varies around a 360-degree circle, and an arbitrarily large number of user devices can receive the pulse and measure the angle-dependent phase at their locations, thereby enabling all the user devices to determine their alignment directions toward the base station at the same time. Each user device can then transmit its phase measurements, or the calculated alignment angle, to the base station, so that the base station can then communicate directionally. (i) For even greater accuracy, the base station and/or the user device can use a predetermined correction function to correct nonlinearities in the as-received angular distribution. The correction function can be applied to the measured phase or to the calculated alignment angle, depending on implementation.

By aligning the transmission and reception beams using the disclosed resource-efficient procedures, user devices and base stations can rapidly and efficiently determine the optimal beam direction for communication, resulting in substantially improved communications with less energy consumption, less background radiation and interference, and improved network performance generally, according to some embodiments.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information.

Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. An "alignment direction" or "alignment angle", as used herein, is a direction from a first wireless entity toward a second wireless entity, or an angle corresponding to that direction, modulo 180. A "phased beam-alignment transmission pulse" is a transmitted pulse of electromagnetic energy which is configured to have a first phase modulation at a first angle and a second phase modulation at a second angle, with the phase modulation varying monotonically between the two angles. In some embodiments, the first and second angles may be 0 and 360 degrees of angle, thereby spanning a complete circle. A "phased beam-alignment reception pulse" refers to a non-directional transmission pulse which is received using an antenna configured to impose an angle-dependent phase delay to the signal, that is, the measured phase depends on the angle of arrival of the energy. Using either the transmission version or the reception version, a receiver can determine the alignment angle toward the transmitter. Wireless pulses which indicate the direction according to the received phase are collectively termed "phased beam-alignment pulses" herein. In the same context, a "calibrator" pulse refers to a wireless transmission that has a predetermined uniform or constant phase modulation versus angle throughout a range of angles. A receiver can receive the calibration pulse non-directionally and thereby calibrate a phase level, and can then compare that phase level with a subsequent phased beam-alignment pulse.

Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude values (and optionally phase values), of a modulation scheme. A "short-form" demodulation reference exhibits the maximum and minimum (amplitude or phase) modulation levels of a modulation scheme, from which the receiver can calculate the intermediate modulation levels and thereby determine all the modulation levels of the modulation scheme from a single short-form demodulation reference. Each modulation level in the calibration set may have a code or number associated with it, and the receiver can demodulate the message element by selecting the modulation level in the calibration set that most closely matches the observed modulation level of the message element, and then assigning that associated code or number to the message element. If the message element has more than one modulation level, such as amplitude and phase, then the two associated codes or numbers may be concatenated to form the demodulated message element. Generally the modulation scheme includes integer Nlevel predetermined amplitude or phase levels. "RF" or radio-frequency refers to electromagnetic waves in the MHz (megahertz) or GHz (gigahertz) frequency ranges. A "sum-signal" is a waveform including the combined signals from a plurality of separately modulated subcarriers. A "beam" is a directed electromagnetic transmission or reception signal, as opposed to an isotropic or non-directional transmission or reception. A "focused transmission beam" is a spatially or angularly narrow directed energy transmission from a transmission antenna, and a "focused reception beam" is a spatially narrow sensitivity or directed receptivity distribution in a reception antenna. (Usually, the same physical antenna can be used for both transmission and reception, and can produce both wide-angle and narrowly focused beams, if provided with appropriate electronics.) Beams may be generated by multi-element antennas using analog or digital means. As mentioned, "reciprocity" is assumed herein, whereby an optimal beam direction for transmission is the same as an optimal beam direction for reception. Directions, and the geographical angles representing them, may be used interchangeably. Signal strength or signal level may represent amplitudes, power such as received power or transmitted power density, or other measure of intensity. As mentioned, "degrees of angle" and "degrees of phase" will be explicitly called out, to avoid confusion of terms.

Turning now to the figures, multiple examples of phased beam-alignment pulses are described with reference to transmitted energy from a transmitter having a certain phase distribution in the transmitted energy. However, as will be discussed later, the same figures can represent an alternative embodiment in which a reception antenna is configured to modify a received signal according to an angle-dependent phase shift, based on the angle of arrival of electromagnetic energy. This will be explained in more detail at the end.

FIG. 1A is a schematic showing an exemplary embodiment of a phased beam-alignment transmission pulse, according to some embodiments. As depicted in this non-limiting example, a base station 101 transmits a phased beam-alignment pulse consisting of multiple broad beams 104, each transmitted beam 104 having a particular phase which is indicated by "P=45" for example, and each beam 104 is aimed at a different angle 103 as indicated by "A=45" for example. A user device 102 is located between A=45 and A=90 degrees of angle. Each beam 104 is configured to cover a sufficiently broad angular range to overlap the adjacent beams. In the example, with just eight beams 104, a beam width of 90 degrees of angle may enable adjacent beams 104 to partially overlap. A receiver positioned in one of the overlap regions would measure a net phase which is a weighted average of the phases of the two overlapping beams. The net phase then progresses monotonically from 0 degrees of phase at 0 degrees of angle, up to 90 degrees of phase at 90 degrees of angle, and continuing around to 360 degrees of phase at 360 degrees of angle.

Since phase is a circular parameter, 0 degrees of phase is equivalent to 360 degrees of phase, just as 0 degrees of angle is the same direction as 360 degrees of angle. An angular distribution of transmitted electromagnetic energy may include an entire circle spanning 360 degrees of angle; such a distribution can be said to include all directions from 0 to 360 degrees of angle, inclusive. Likewise, a distribution of phase modulations that includes all phase values from 0 to 360 degrees of phase can be said to span the range of phases from 0 to 360 degrees of phase inclusive, notwithstanding that waves with 0 and 360 degrees of phase are identical, and likewise 0 and 360 degrees of angle represent the same direction. In addition, the phase distribution versus angle of the resultant distribution, such as the phase distribution generated by the combination of beams 104, may be configured to progress monotonically with angle, from a first angle to a second angle. In some embodiments, the phase can be configured to vary linearly, or substantially linearly, from the first to the second phase. In the depicted case, the phase varies in close correspondence with the angle, such that a phase of 180 degrees of phase is transmitted in a direction corresponding to 180 degrees of angle, and likewise for other angles. (Contrasting arrangements are discussed below.)

The user device 102, at an arbitrary location near the base station 101, can then receive the phased beam-alignment pulse produced by the beams 104 in combination, can measure the net phase at that location, and can thereby determine the alignment angle of the user device 102 relative to the base station 101. In the depicted case, the angle of the receiver relative to the transmitter is configured to be substantially equal to the measured phase of the phased beam-alignment pulse as received by the receiver, since both phase and angle progress together around the circle. In the depicted case, the phase rotates by one turn when the angle rotates by one turn. With adjustment of the beam widths and other parameters, the phase dependence on angle can usually be made to closely approximate a linear dependence. Any remaining small variations mitigated by a correction function, as discussed below.

The example shows the 360-degree phased pulse assembled from eight single-phase beams 104, however there may be a different number of single-phase beams in other embodiments, such as 16 or 32 of the single-phase beams aimed in different directions.

There are many other ways to generate a monotonic distribution of phase with angle, besides the overlapping single-phase beams as depicted here. For example, a phased-array antenna consisting of a large number of individually powered emitters, can be programmed to emit the desired phase-versus-angle transmission directly, without generating the single-phase beams as intermediates. In another implementation, the antenna can be energized to emit energy in a wide beam, with the phase varying in a step-wise manner versus angle within the wide beam, which can produce the desired monotonic phase variation versus angle, by adjustment of the positions and sizes of the steps. It is immaterial, for present purposes, how the phased beam-alignment pulse is generated at the antenna, so long as the transmitted pulse has a monotonic relationship between the positional angle of the receiver and its received phase.

In some embodiments, a correction function can be configured to mitigate remaining nonlinearities (if any) in the phase-angle relationship of the phased beam-alignment pulse. For example, the correction function can be a difference between the actual phase distribution and an ideally linear phase-angle relationship. The receiver, or whichever entity performs the analysis, can then apply the correction function to negate the nonlinearities. In a first version, the correction function may be applied to the measured phase itself, correcting the phase to eliminate or reduce nonlinearities. In a second version, the correction function may adjust the calculated alignment angle, with the same effect. With such a correction, the receiver may thereby achieve improved precision in the receiver localization, and improved determination of the alignment direction.

Figure 1B:
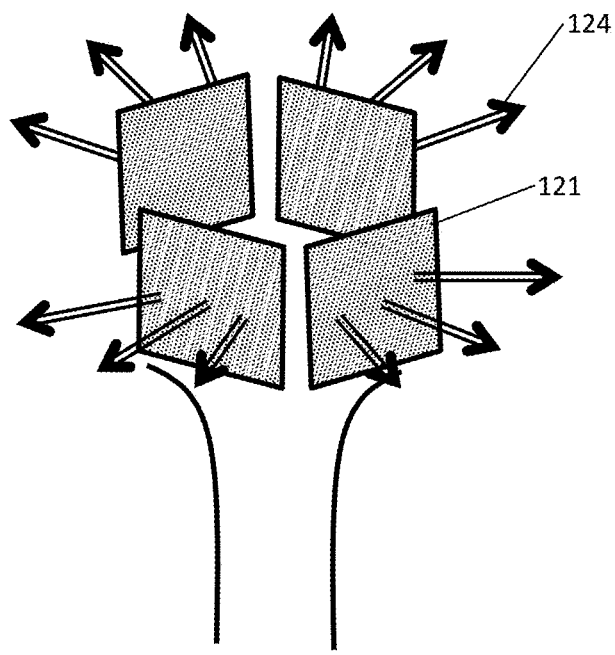
FIG. 1B is a schematic showing an exemplary embodiment of phased beam-alignment pulses transmitted from multiple antennas, according to some embodiments.

FIG. 1B is a schematic showing an exemplary embodiment of a phased beam-alignment pulse transmitted from multiple antenna modules, according to some embodiments. As depicted in this non-limiting example, four antenna modules 121 together emit a phased beam-alignment pulse which is composed of multiple separately-generated, overlapping beams 124 aimed in multiple directions, each beam 124 being phased according to its direction, and each beam 124 being sufficiently broad to overlap with the adjacent beams. Phased-array antennas with digital control of the antenna elements can generally emit multiple beams with different phases in multiple directions simultaneously, for example by summing the driver amplitudes to the various antenna elements according to each of the beams. Multiple antenna modules 121 (in this case four) are used because it is difficult for a single phased-array antenna module to transmit energy all around a 360-degree circle. By transmitting phased energy spanning 90 degrees of angle per antenna module, the combination of four antenna modules 121 can cover the 0-360 range of angles.

As an alternative, the phased beam-alignment pulse, with a monotonic phase versus angle distribution, can be generated without using the depicted single-phase beams 124. Instead, a multitude of antenna elements in each antenna module 121 may be energized and timed to project the desired distribution of energy and phase. Any suitable strategy for transmitting electromagnetic energy between a first and second angle, with a monotonic relationship between direction and phase, may be used.

Figure 2A:
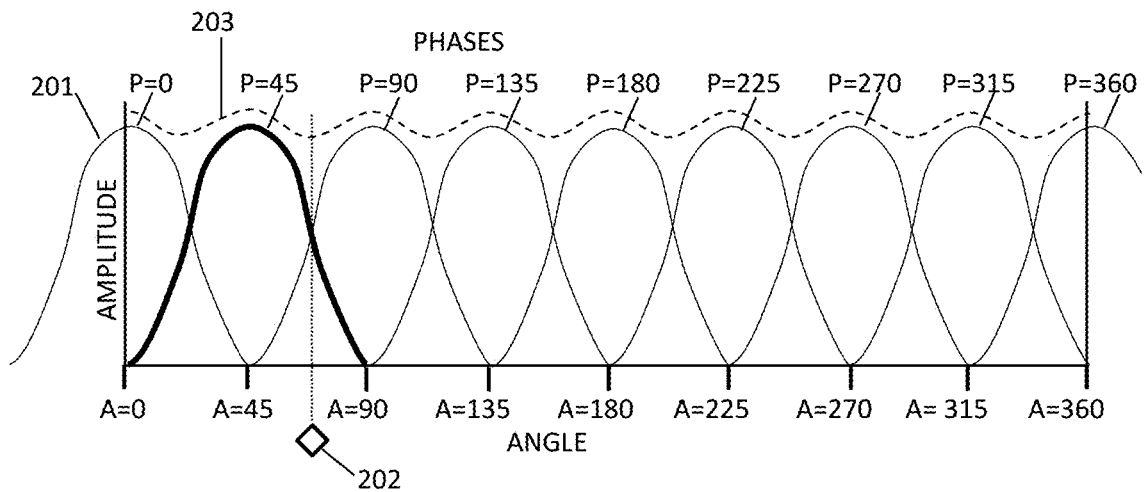
FIG. 2A is a schematic showing an exemplary embodiment of a phased beam-alignment pulse formed from multiple single-phase beams transmitted in various directions around 360 degrees of angle, according to some embodiments.

FIG. 2A is a schematic showing an exemplary embodiment of a phased beam-alignment pulse formed from multiple single-phase beams transmitted in various directions spanning 360 degrees of angle, according to some embodiments. As depicted in this non-limiting example, a plurality of wide beams 201 are shown versus angle (A=45 etc.). One beam is bolded for clarity. Each beam 201 is transmitted in a particular direction (such as A=45) with a particular phase modulation (such as P=45).

A receiver 202 is shown at an angle of about 67.5 degrees of angle. The receiver 202 receives a wave resulting from the vector sum of the two overlapping beams at A=45 and A=90 degrees of angle.

The resultant from all the beams 201 is shown as a dashed curve 203. The resultant amplitude 203 is not a simple sum of the overlapping beam amplitudes, because the beams have different phases. Instead, the beams combine trigonometrically according to the difference in their phases. In the figure, the phase difference between beams is 45 degrees of phase, so that eight beams cover 360 degrees. In other implementations, a larger or smaller number of beams may be used. The resultant amplitude 203 is shown with amplitude variations. These amplitude variations can be greatly reduced by adjusting the width of each beam 201. However, that amplitude equalization may not be necessary, because amplitude variations are largely irrelevant in the present application. The alignment direction is determined by the phase of the received signal, not its amplitude.

The phase of the resultant wave in each direction is determined by the phases and spacings of the individual beams 201. For example, in a direction centered on one beam, such as the beam marked P=45 at an angle of A=45, a receiver positioned at that angle would receive the phase of that beam, with little or no intermingling of other beams. A receiver at an angle mid-way between two beams (such as the receiver position 202), would measure a resultant phase which is mid-way between the two phases, because the two beams contribute equally at that angle. Hence the phase measured by the receiver 202 is 67.5 degrees of phase at the receiver's location.

At other angles (other than centered on a beam or midway between beams), the received phase is related to the width and angular distribution of the overlapping beams; but for most practical distributions, the phase varies closely with angle and can be approximated by a linear progression of phase with angle. The phase measurement therefore provides a direct indication of the alignment angle at the location of the receiver. As mentioned, any (usually minor) deviations from phase-angle linearity can be mitigated by measuring or modeling the resultant phase versus angle from the various beams, and deriving a correction function equal to a difference between the measured distribution and an ideal linear relationship of phase versus angle, then adding or subtracting that difference to the measured phase to cancel the nonlinearities.

Figure 2B:
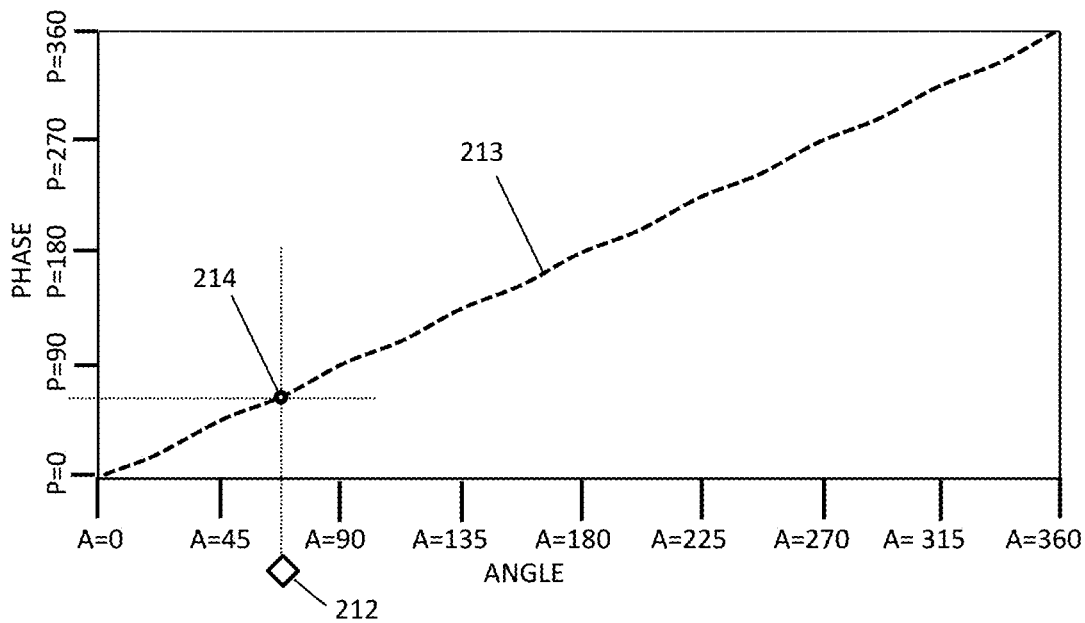
FIG. 2B is a schematic showing an exemplary embodiment of a phased beam-alignment pulse showing a correlation between angles and phases, according to some embodiments.

FIG. 2B is a schematic showing an exemplary embodiment of a phased beam-alignment pulse with a correlation between angles and phases, according to some embodiments. As depicted in this non-limiting example, the received phase (P=45, etc.) of a phased beam-alignment pulse 213 is plotted versus angle (A=45 etc.). The relationship is monotonic throughout the range of 0-360 degrees of angle. A receiver 212, located at 67.5 degrees of angle, measures a phase, as indicated by dotted lines. The measured phase is 67.5 degrees of phase, which is equal to the alignment direction in this case. Thus the receiver 212 has determined its alignment direction, relative to a transmitter, according to the phase received in a single phased beam-alignment pulse.

Figure 2C:
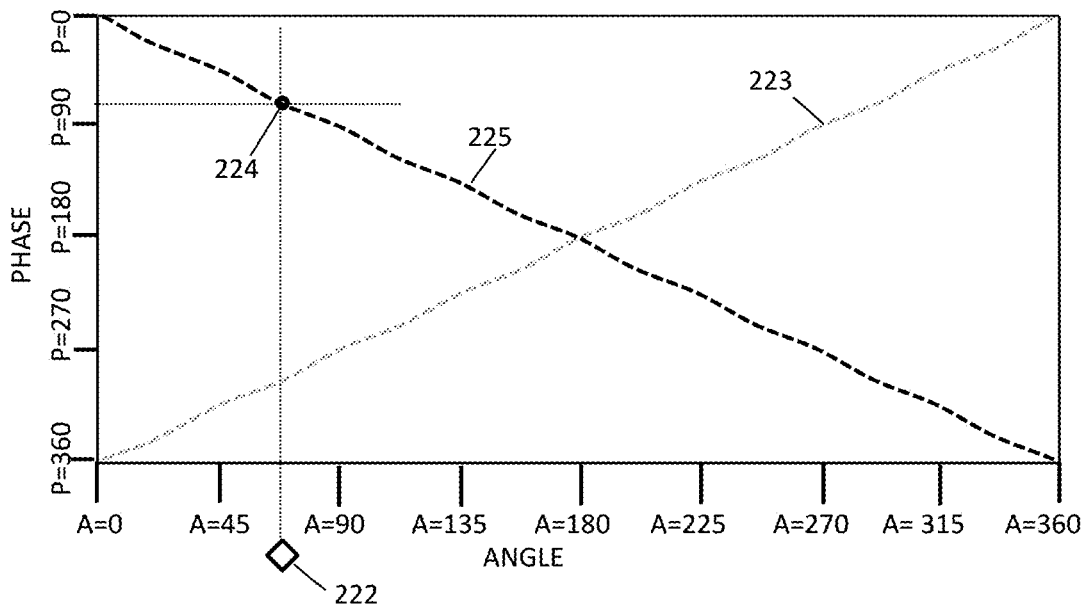
FIG. 2C is a schematic showing an exemplary embodiment of a phased beam-alignment pulse with a reverse slope, according to some embodiments.

FIG. 2C is a schematic showing an exemplary embodiment of a phased beam-alignment pulse with a reverse slope, according to some embodiments. As depicted in this non-limiting example, a phased beam-alignment pulse 225 with a reversed (that is, negative) relationship between phase and angle, is plotted. The phase corresponding to each angle is shown on the vertical axis, which is now in descending order, corresponding to the reverse slope of the angle-phase relationship. The non-reversed pulse 223 of the previous figure is also shown ghosted, for comparison.

The receiver 222 again measures the phase 224, as indicated by dotted lines, and again determines that the angle is 67.5 degrees of angle. In some embodiments, the receiver can average the two phase measurements and thereby obtain a more accurate value of the alignment angle. An advantage of performing the beam alignment measurement twice, with opposite angle-phase relationships, may be that errors due to noise and other sources may be canceled by averaging the two measurements, thereby providing improved accuracy in the alignment angle determination.

Figure 2D:
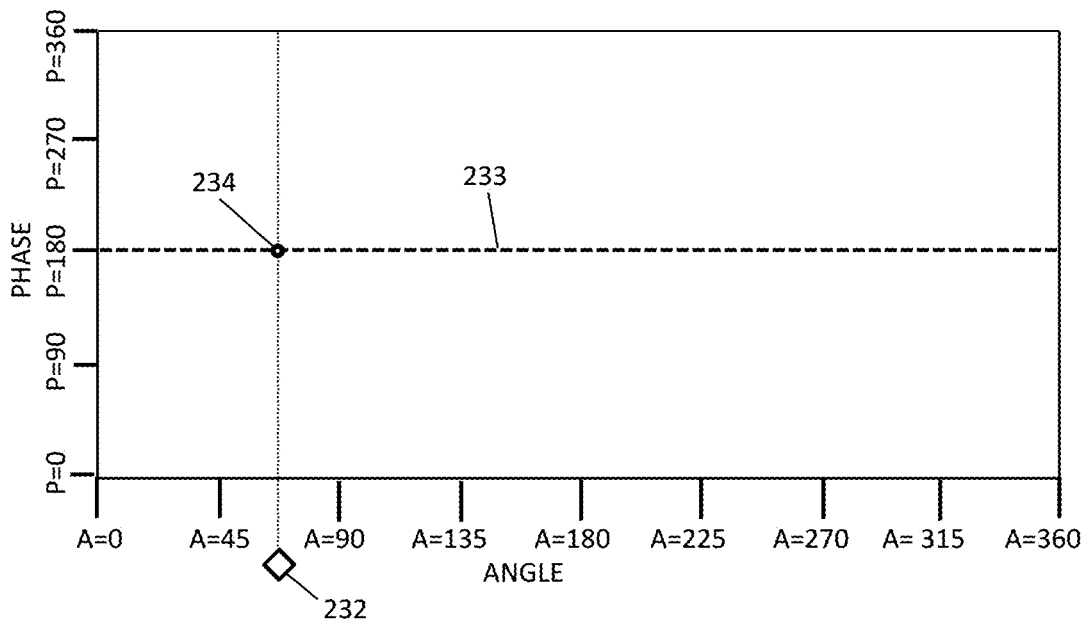
FIG. 2D is a schematic showing an exemplary embodiment of a phase calibrator pulse, according to some embodiments.

FIG. 2D is a schematic showing an exemplary embodiment of a phase calibrator pulse, according to some embodiments. As depicted in this non-limiting example, a calibrator pulse 233 is a transmission having a uniform phase across a wide angular range, in this case across a full 0-360 degrees of angle. The transmitted phase is arbitrary but predetermined and known to the receiver. In this case, it is 180 degrees of phase, but any calibrator phase will do, as long as the receiver 232 knows what value to assign to its measurement 234. After calibrating the phase in this way, the receiver 232 can then analyze a received phase of a phased beam-alignment pulse, while eliminating errors (such as timing drifts that affect the calibrator and the phased beam-alignment pulse in the same way), and can thereby obtain improved accuracy in the alignment angle determination.

Figure 2E:
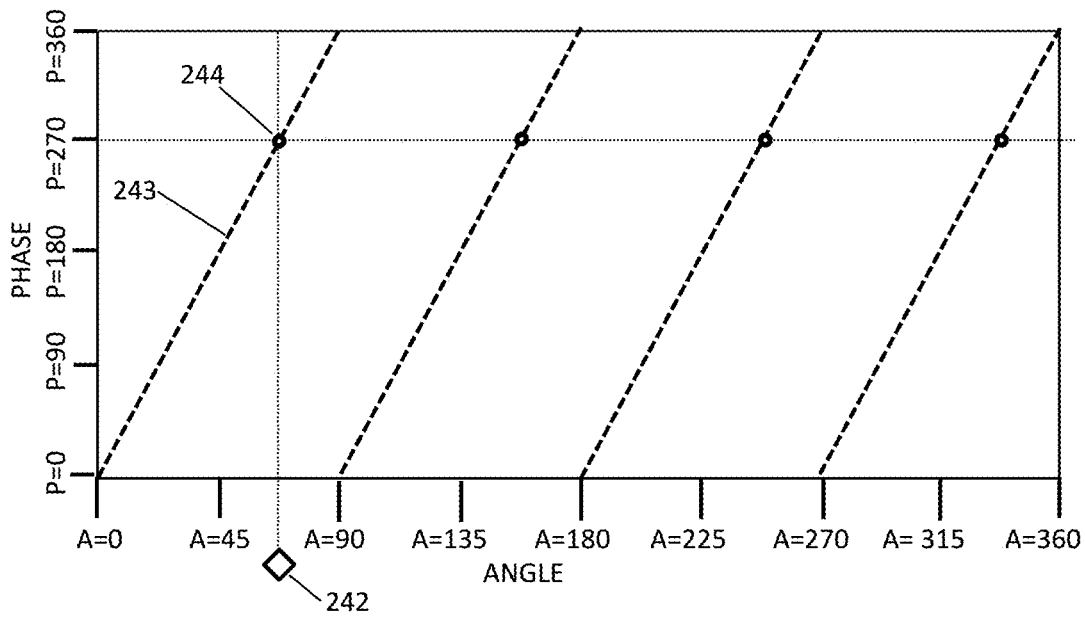
FIG. 2E is a schematic showing an exemplary embodiment of a phased beam-alignment pulse with four phase cycles per 360 degrees of angle, according to some embodiments.

FIG. 2E is a schematic showing an exemplary embodiment of a phased beam-alignment pulse with four phase cycles per 360 degrees of angle, according to some embodiments. As depicted in this non-limiting example, a four-cycle phased beam-alignment pulse 243 is transmitted, with a phase distribution as plotted graphically, with phase on the vertical axis and angle on the horizontal axis. The phase of the pulse 243 is configured to vary through four cycles of 0-360 degrees of phase (that is, the phase varies from 0 to 1440 degrees of phase), in one angular range of 0-360 degrees of angle. Stated differently, the phase spans 0 to 360 degrees of phase, in an angular span of 0 to 360/N degrees of angle, with N=4 in this case. Thus the phase varies four times more rapidly, versus angle, than in the previous single-cycle examples.

A receiver 242 measures the received phase at its position of A=67.5 degrees of angle, and determines from the measurement that the received phase is 270 degrees of phase. However, as shown in the figure, there are four possible angles consistent with the measured phase. To determine the alignment angle unambiguously, the receiver 242 may compare the present measurement 244 with another measurement, such as the single-cycle measurement 214 of FIG. 2B, and may thereby resolve the ambiguity. In this case, the single-cycle measurement of FIG. 2B is consistent with only one of the four possible phases in FIG. 2E. More specifically, the single-cycle measurement of 67.5 degrees can be multiplied by four (corresponding to the four-cycle distribution 243), which is then compared with the four-cycle phase determination 244. More specifically, the single-cycle measurement of 67.5, times four (for the four-cycle case) equals 270 degrees of angle, which is the value observed.

Alternatively, the 270-degree result of the four-cycle measurement 244 may be divided by the number of cycles (4) to obtain 67.5 degrees. By either analysis, the agreement indicates that the two measurements are consistent, and that the alignment angle is 67.5 degrees of angle. The four-cycle measurement can provide higher precision than a single-cycle measurement, due to the more rapid variation in phase. The single-cycle measurement is still needed, however, to resolve the four-fold ambiguity.

Figure 2F:
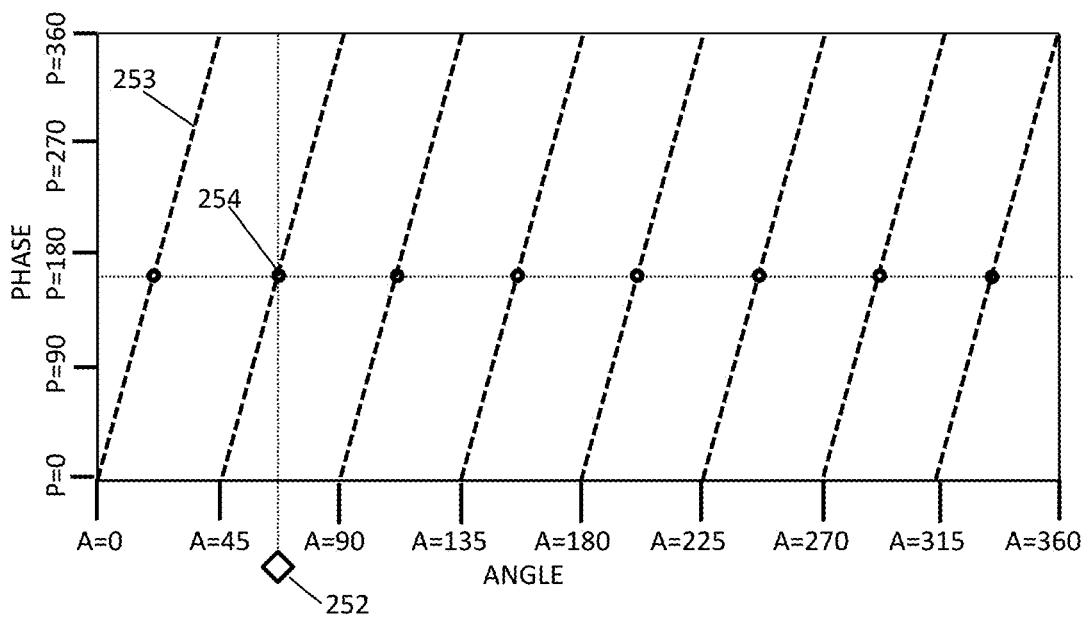
FIG. 2F is a schematic showing an exemplary embodiment of a phased beam-alignment pulse with eight phase cycles per 360 degrees of angle, according to some embodiments.

FIG. 2F is a schematic showing an exemplary embodiment of a phased beam-alignment pulse with eight phase cycles per 360 degrees of angle, according to some embodiments. As depicted in this non-limiting example, an eight-cycle phased beam-alignment pulse 253 is shown proceeding through 360 degrees of phase in just 45 degrees of angle, which corresponds to eight phase cycles in 360 degrees of angle. A receiver 252 measures 254 the phase at its location. The measurement is ambiguous because the same phase shows up eight times at different angles. When combined with the initial measurement 214, the ambiguity is resolved and the alignment angle is determined precisely.

Figure 3A:
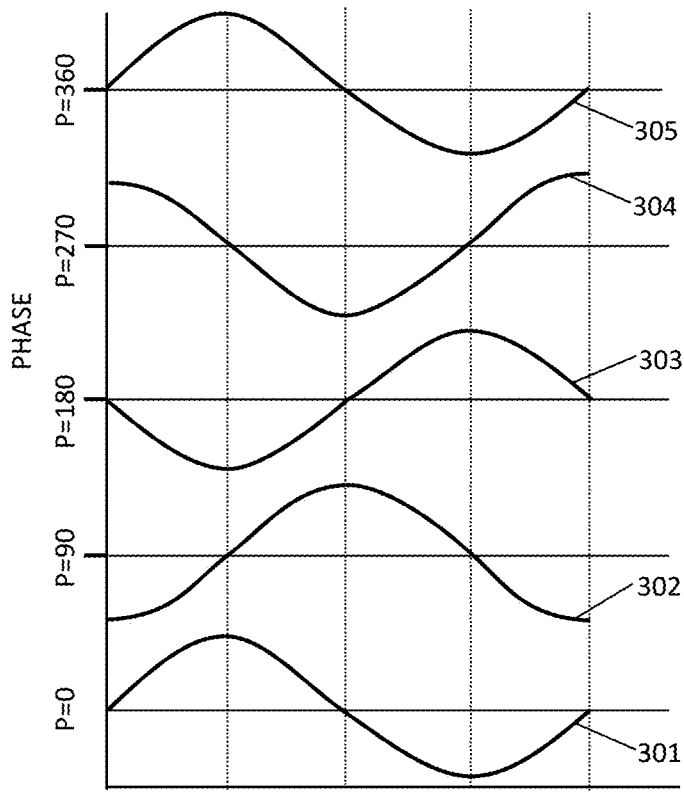
FIG. 3A is a schematic showing an exemplary embodiment of phased beam-alignment pulses with various phases in various directions, according to some embodiments.

FIG. 3A is a schematic showing an exemplary embodiment of phased beam-alignment pulses with various phases in various directions, according to some embodiments. As depicted in this non-limiting example, five sinusoidal waves are shown including wave 301 with 0 degrees of phase, wave 302 with 90 degrees of phase, wave 303 with 180 degrees of phase, wave 304 with 270 degrees of phase, and wave 305 with 360 degrees of phase. Waves 301 and 305 look the same because a phase of 0 is equivalent to a phase of 360. For the same reason (circularity) a direction of 0 degrees of angle is equivalent to a direction of 360 degrees of angle.

The waves 301-305 may represent the waveforms of five single-phase beams transmitted in different directions. A receiver positioned at an angle corresponding to each of these waves would detect the phase of that wave. A receiver positioned mid-way between the two angles, receiving equal amounts of the two overlapping waves, would measure a phase mid-way between the phases of the two waves. A receiver positioned at some other angle would receive different amounts of the two contributing waves, and therefore would measure a phase proportionally related to the amounts of those two contributing waves. By adjusting the transmitted beam widths to overlap with the adjacent beams, the resulting measured phase can be configured to closely approximate a linear proportionality between the phase and the angle. The resulting distribution can provide a nearly proportional relationship between angle and phase at intermediate angles as well as the beam centers and the mid-way angles between the beam centers. In addition, the deviation from linearity can generally be improved by providing more transmitted beams at more angles, such as sixteen beams instead of the eight shown in FIG. 2A or the four waves shown here, thereby improving further the proportionality between phase and angle.

Figure 3B:
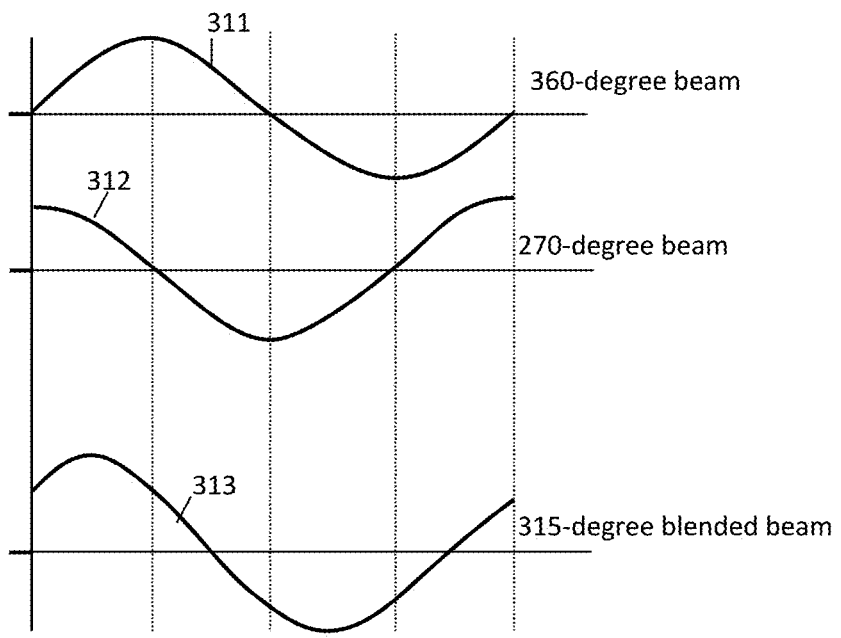
FIG. 3B is a schematic showing an exemplary embodiment of two beams with phase blending, according to some embodiments.

FIG. 3B is a schematic showing an exemplary embodiment of two beams with phase blending, according to some embodiments. As depicted in this non-limiting example, a first beam 311 is transmitted with a 360-degree phase at a first angle, and a second beam 312 is transmitted with a 270-degree phase at a second angle. A receiver (not shown) is positioned mid-way between the first and second angles, and receives the first and second beams 311-312 simultaneously. Since the receiver is mid-way between the two beam centers, the as-received waveform 313 is the vector sum of the two transmitted beams 311-312, which exhibits a phase of 315 degrees of phase, which is mid-way between the phases of the two contributing beams 311-312.

In a similar way, the overlapping single-phase beams of the previous examples, if received by a receiver positioned mid-way between adjacent beams, or at other angles, can produce a resultant waveform that exhibits a phase between the phases of the two contributing pulses. The receiver can then determine its alignment angle relative to the transmitter by measuring the phase of the resultant waveform as received.

Figure 4:
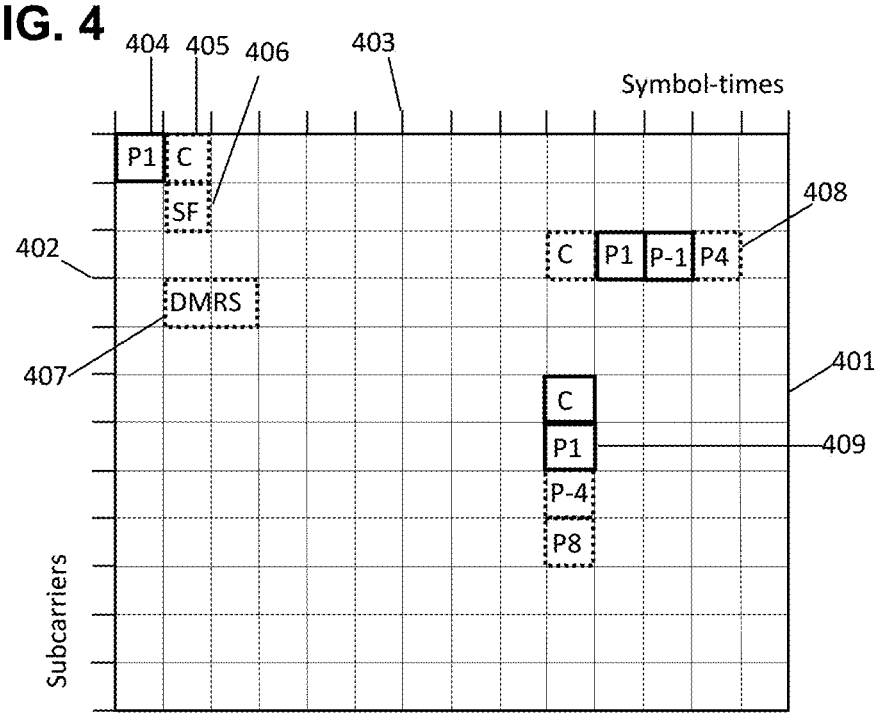
FIG. 4 is a schematic showing an exemplary embodiment of a resource grid including several phased beam-alignment pulses, according to some embodiments.

FIG. 4 is a schematic showing an exemplary embodiment of a resource grid including several phased beam-alignment pulse examples, according to some embodiments. As depicted in this non-limiting example, a resource grid 401 consists of resource elements defined by subcarriers 402 in frequency and symbol-times 403 in time. A phased beam-alignment pulse 404 ("P1") is transmitted in one resource element. A receiver can measure the as-received phase of the P1 pulse 404 and thereby determine the alignment angle of the receiver relative to the transmitter.

An optional calibrator pulse "C" 405 is shown in dash, proximate to the phased beam-alignment pulse 404. The receiver can measure the phase of both pulses 404-405, calculate the difference in phases, and thereby mitigate noise and interference in determining the alignment angle. Alternatively, an optional short-form demodulation reference "SF" 406 is shown, providing the same information. A short-form demodulation reference is a demodulation reference in one or two resource elements exhibiting the maximum and minimum modulation (such as amplitude or phase) levels of the modulation scheme, and can thereby provide a calibration phase from which the receiver can then determine the phase of the phased beam-alignment pulse 404. As a third option, a DMRS (demodulation reference signal) 407 is shown, which also provides a phase reference but with complex encoding.

In addition, a set of phased beam-alignment pulses 408 is shown according to FIG. 2C or 2E, including an optional calibrator pulse C, a first single-cycle phased beam-alignment pulse P1, then a reversed single-cycle phased beam-alignment pulse P-1 as in FIG. 2C, and finally an optional four-cycle phased beam-alignment pulse P4 as in FIG. 2E. The set of pulses 408 is shown time-spanning, that is, occupying successive symbol-times at a particular subcarrier.

Also shown is another set of phased beam-alignment pulses 409, including an optional calibrator pulse, a single-cycle phased beam-alignment pulse P1, an optional reversed four-cycle phased beam-alignment pulse P-4 (as in FIG. 2E but with opposite slope), followed by an optional eight-cycle phased beam-alignment pulse P8 as in FIG. 2F. The set of pulses 409 is shown transmitted frequency-spanning, that is, occupying successive subcarriers at a single symbol-time. Transmitting the various pulses simultaneously in successive subcarriers can save time, but would be quite demanding in terms of both transmitter antenna performance and receiver performance. Transmitting the pulses time-spanning may be easier to transmit for many transmitters, and easier to measure for many receivers. For further accommodation, the time-spanning pulses 408 may be spaced apart by a gap or symbol-time of no transmission, or the frequency-spanning pulses 409 may be spaced apart in frequency by leaving a blank subcarrier between pulses.

Figure 5:
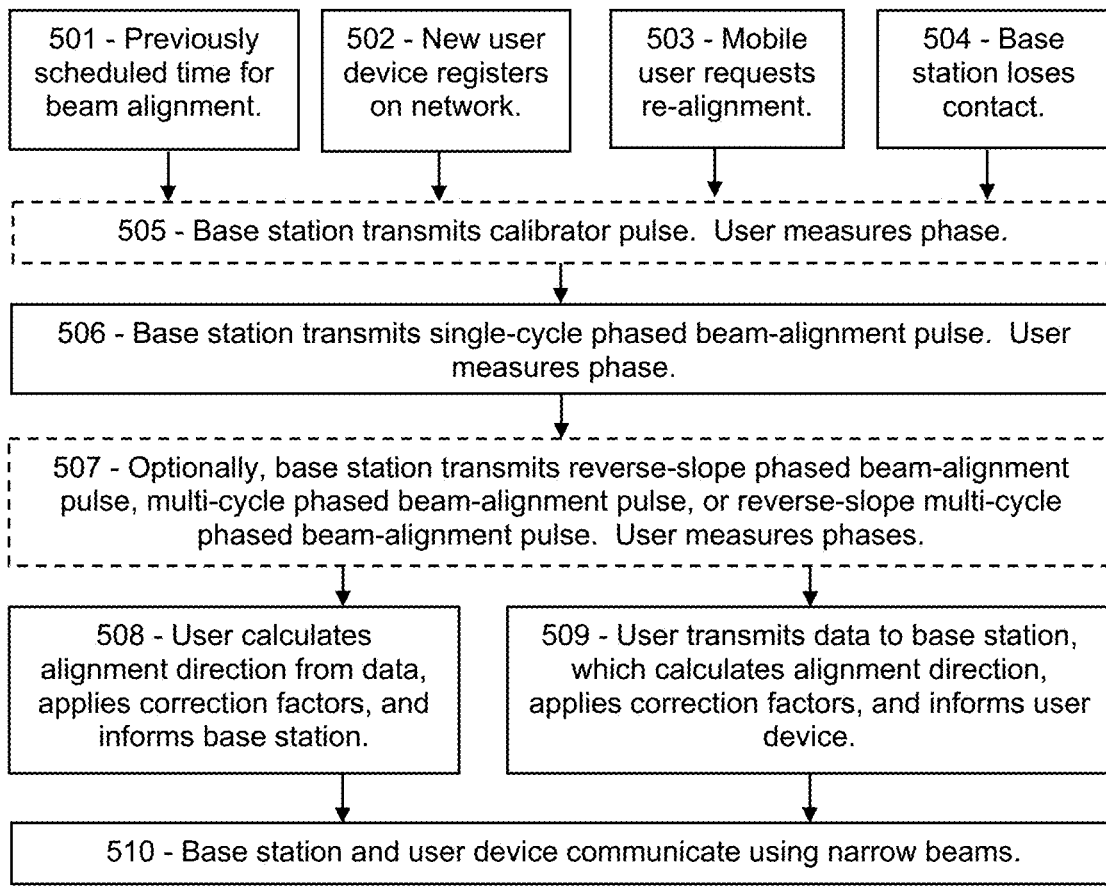
FIG. 5 is a flowchart showing an exemplary embodiment of a procedure for a user device and a base station to cooperatively determine the alignment direction, according to some embodiments.

FIG. 5 is a flowchart showing an exemplary embodiment of a procedure for a user device and a base station to cooperatively determine the alignment direction, according to some embodiments. As depicted in this non-limiting example, a beam alignment session may be triggered by at least four possible events: 501 a semi-persistently scheduled time for automatically transmitting phased beam-alignment pulse(s), 502 a new user device is registering in the network and needs alignment service, 503 a mobile user device has relocated and therefore requests an alignment pulse, or 504 the base station loses contact with a previously beam-connected user device. Optionally, 505 the base station may transmit a calibrator pulse consisting of a non-directional, uniformly phased signal pulse to provide a phase baseline for comparison with the phased beam-alignment pulse. At 506, the base station then transmits a single-cycle phased beam-alignment pulse in a single resource element, with the phase of the transmitted pulse configured to correspond to the angular position, such as the phase (in degrees of phase) being equal to the angle (in degrees of angle). The phase may be relative to the calibrator pulse (or another phase reference), and the angle may be relative to a predetermined direction such as geographic north. The user device measures the phase at its location.

At 507, optionally, the base station may transmit a second, single-cycle, reverse phased beam-alignment pulse, and/or various other configurations with multiple phase cycles per 360-degree angle, for example. The user device measures the received phase for each of these pulses.

At 508, the user device calculates its alignment angle according to the phase detected. Correction factors, if known, may be applied. The user device may then inform the base station of the alignment angle so that the base station can subsequently communicate directionally. Alternatively, at 509, the user device can transmit the measured phase (or phases, if there are multiple alignment pulses) to the base station, and the base station can calculate the alignment angle including any correction factors, and may then inform the user device of the alignment angle. Thereafter, at 510, the base station and the user device can communicate using narrow directed beams, aimed according to the alignment direction, for enhanced signal reliability and reduced background generation.

Figure 6:
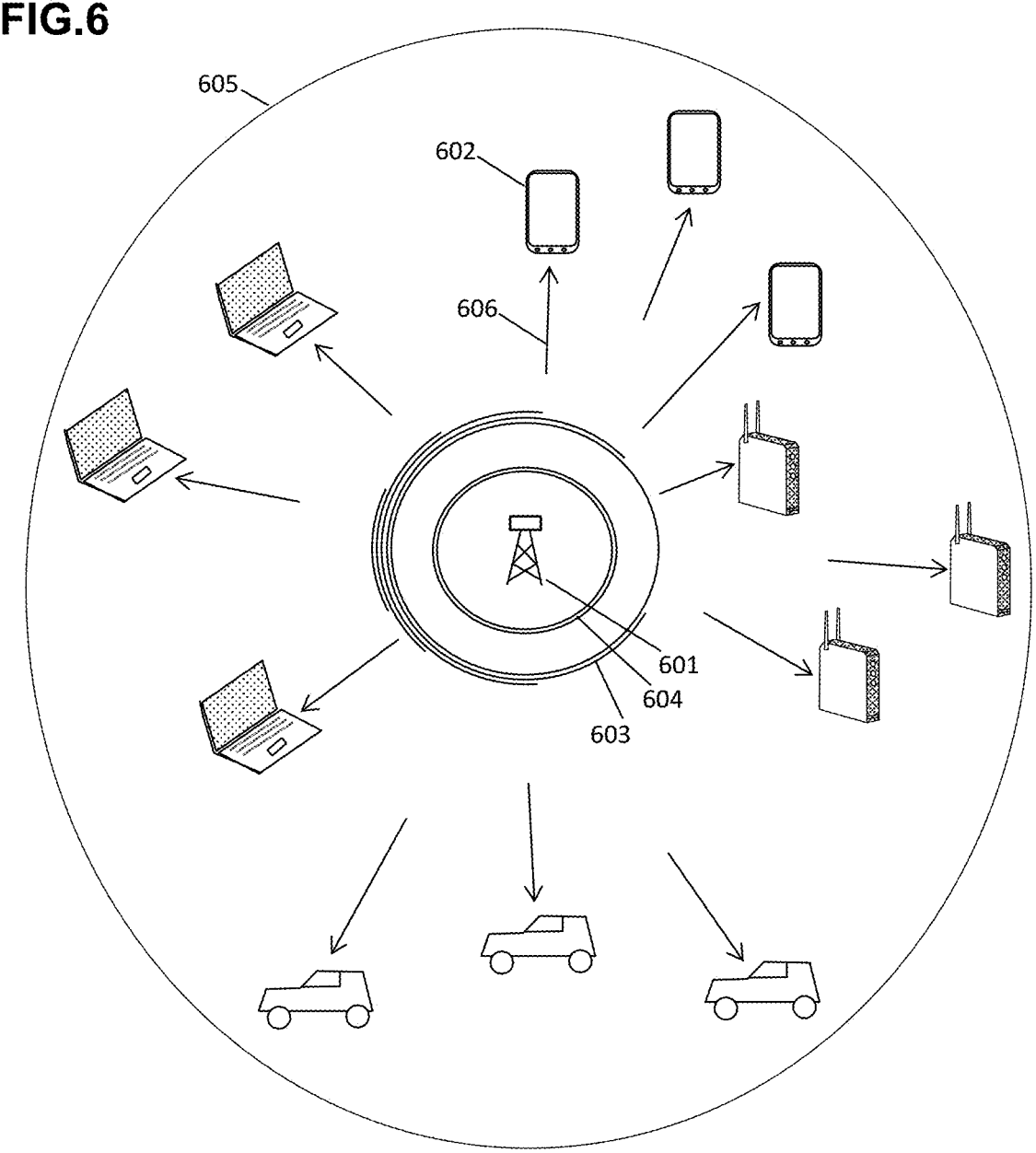
FIG. 6 is a schematic showing an exemplary embodiment of a wireless network with phased beam-alignment pulses, according to some embodiments.

FIG. 6 is a schematic showing an exemplary embodiment of a wireless network with phased beam-alignment pulses, according to some embodiments. As depicted in this non-limiting example, a wireless network 605 includes a base station 601 and a plurality of user devices 602 such as mobile phones, routers, vehicles, and computers. The base station 601 emits a calibration pulse 604 followed by a phased beam-alignment pulse 603, which in this case is a single-cycle phased beam-alignment pulse, with the phase variation indicated crudely by a cluster of arcs. The user devices 602 can measure the pulses 604-605 and measure the received phase of the phased beam-alignment pulse 603, and can thereby determine their alignment direction 606 relative to the base station.

Thus the base station and an arbitrary number of user devices have all aligned their beams, while consuming just one resource element for one phased beam-alignment pulse (or at most a small number of such pulses if reversed or multi-cycle pulses are desired).

Each of the foregoing examples was presented as transmitted beams or pulses having various phase relationships, from which a receiver can determine its angular position relative to the transmitter. As an alternative method, the transmitter can transmit an ordinary pulse of electromagnetic energy with the same phase in all directions, while the receiver can receive the transmission using a phased reception configuration of its antenna. The receiver can thereby determine its alignment angle based on the measured phase using that antenna as an angle-dependent phase transducer. For example, the transmitter can transmit a single pulse of energy, in all directions around 360 degrees of angle, and with the same predetermined phase in all directions. The receiver can configure its reception antenna to produce a phase shift of the received signal, the phase shift being proportional to the angle of arrival of the signal. The receiver can then measure the as-received phase (including the imposed angle-dependent phase shift) and can thereby determine the alignment angle toward the transmitter.

In an embodiment, the transmitter may be a user device, such as a reduced-capability user device that lacks beam-forming capability entirely, while the receiver is the base station. The reduced-capability user device transmits an ordinary pulse isotropically. The base station, on the other hand, usually has a versatile antenna capable of performing a phase measurement using the reception phased beam-alignment configuration, and can thereby determine the direction toward the user device according to the phase of the received pulse based on the angle of arrival. The base station can then direct downlink messages toward the user device using a narrow focused transmission beam. The reduced-capability user device may detect the downlink message using its non-directional antenna. The base station would probably not waste time transmitting the alignment message to the user device in this case, because the user device, lacking directionality, has no use for that information.

For extra precision, the transmitter can transmit a second non-directional non-phased pulse, and the receiver can configure the reception antenna to have a reversed distribution of phase delay versus arrival angle, and can measure the second transmission. By averaging the two phase measurements, the receiver can thereby determine the alignment angle while canceling certain noise distortions, as suggested in FIG. 2C. The receiver can also configure the reception antenna to provide two or four or eight phase cycles per 360 degrees of angle, and can measure the received phase of a third pulse using that reception configuration, as suggested in FIGS. 2E and 2F.

There are many ways to prepare such an angle-dependent phase response of a reception antenna, using a phased-array antenna with multiple independently-processed reception elements. In one embodiment, the receiver can configure the reception antenna to have an angle-dependent phase relationship by preparing a plurality of directional reception "beams" (that is, angular regions of enhanced receptivity), each reception beam causing a different phase shift in the received signal. Then the received signal, produced by a wave arriving at the reception antenna from a particular direction, is the merged sum of the various reception beams that overlap in the particular direction. The received signal then includes the desired phase-versus-angle relationship, so that the receiver can determine its alignment direction directly from the phase of the received signal. In particular, if the transmitter is located between two of the reception beams, the received signal will exhibit a phase intermediate between those two reception beams, as suggested in FIGS. 3A and 3B.

To receive signals around a full 360-degree circle, the receiver may include multiple reception antennas, such as four, oriented in different directions.

In other words, each of the foregoing examples can apply to a receiver with an antenna (or a plurality of antenna modules) configured to impose an angle-dependent phase shift on the received signal, the phase shift based on the arrival direction of the received signal. In addition, each example can apply equally well to a transmitted phased pulse in which the angle-phase relationship is imposed by the transmitter. In either configuration, (angle-dependent transmitter or angle-dependent receiver) the receiver can determine its alignment angle from the measured phase of the as-received pulse.

The systems and methods disclosed herein may enable base stations and wireless devices to align their transmission and reception beams in a managed network. In a non-managed network such as an ad hoc network among mobile user devices, the communicating entities can align their beams in the same way, but with one of the mobile user devices temporarily assuming the role of the base station and communicating on a sidelink channel.

The systems and methods may enable wireless devices to align their reception and transmission beam directions quickly and efficiently, with little consumption of resource elements. A single phased beam-alignment pulse may enable an arbitrary number of user devices to determine their alignment directions simultaneously, further minimizing time and energy usage. The systems and methods may thereby provide improved communication reliability with less energy consumption and less background generation, thereby enhancing network function and user satisfaction overall.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a first wireless entity to determine an alignment angle toward a second wireless entity, the method comprising:
   a) transmitting, by the first wireless entity, a first pulse configured to span an angular range between a first angle and a second angle, wherein the first pulse is phase modulated according to a first phase value at the first angle and a second phase value at the second angle, and wherein the phase varies monotonically from the first phase value at the first angle to the second phase value at the second angle;
   b) receiving, from the second wireless entity, a message indicating a measured phase value; and
   c) calculating the alignment angle toward the second wireless entity, according to the first and second angles, the first and second phase values, and the measured phase value.

2. The method of claim 1, wherein the message is configured according to 5G or 6G technology.

3. The method of claim 1, wherein the first entity is a base station or an access point of a wireless network, and the second entity is a user device of the wireless network.

4. The method of claim 3, wherein the first pulse is embedded in or concatenated with a system information message transmitted by the base station or access point.

5. The method of claim 4, wherein the system information message is a synchronization signal block (SSB) message or a system information block message of type n (SIBn) where n is an integer.

6. The method of claim 4, wherein the system information message is part of a two-step or four-step initial access procedure.

7. The method of claim 1, further comprising transmitting, to the second wireless entity, a message indicating either:
   a) the alignment angle toward the second entity; or
   b) 180 degrees plus the alignment angle toward the second entity, modulo 360degrees.

8. The method of claim 1, wherein the calculating the alignment angle toward the second entity comprises:
   a) calculating a ratio comprising the measured phase value divided by a difference between the second and first phase values;
   b) calculating a product by multiplying the ratio times a difference between the second and first angles; and
   c) adding the product to the first angle.

9. The method of claim 1, wherein the calculating the alignment angle toward the second entity comprises:
   a) calculating a ratio comprising a difference between the second and first angles divided by a difference between the second and first phase values;
   b) calculating a product by multiplying the ratio times the measured phase value; and
   c) adding the product to the first angle.

10. The method of claim 1, further comprising:
    a) transmitting, proximate to the first pulse, a calibrator pulse configured to span the angular range between the first angle and the second angle;
    b) wherein the calibrator pulse is transmitted with a constant phase value throughout the angular range between the first angle and the second angle.

11. The method of claim 1, wherein the first and second wireless entities are mobile wireless devices, and the first pulse is transmitted on a frequency allocated for sidelink communications.

12. The method of claim 1, further comprising:
    a) transmitting, by the first wireless entity, a second pulse configured to span the angular range between the first angle and the second angle;
    b) wherein the second pulse comprises a phase which is modulated, at the first angle, according to the second phase value, and is modulated, at the second angle, according to the first phase value; and c) wherein the phase of the second pulse varies monotonically, from the second phase value to the first phase value, as the angle ranges from the first angle to the second angle.

13. Non-transitory computer-readable media in a first wireless entity of a wireless network, the non-transitory computer-readable media containing instructions that, when executed by a computing environment, cause a method to be performed for determining an alignment angle toward a second wireless entity, the method comprising:
   a) transmitting a first pulse of electromagnetic energy spanning 360 degrees of angle around the first entity;
   b) wherein the first pulse is configured to have a phase value that varies by 360degrees of phase as the angle is varied by 360 degrees of angle around the first wireless entity; and
   c) wherein the phase value varies monotonically with angle.

14. The non-transitory computer-readable media of claim 13, the method further comprising receiving, from the second wireless entity, a reply message indicating a received phase value received by the second wireless entity.

15. The non-transitory computer-readable media of claim 14, the method further comprising:
   a) calculating the alignment angle toward the second wireless device according to the received phase value; and
   b) transmitting a data message unicast to the second wireless entity indicating either the alignment angle toward the second wireless entity or 180 degrees plus the alignment angle toward the second wireless entity, modulo 360 degrees.

16. The non-transitory computer-readable media of claim 13, the method further comprising:
   a) transmitting a second pulse of electromagnetic energy spanning 360 degrees of angle around the first wireless entity;
   b) wherein the second pulse is configured to have a second phase value that varies by N times 360 degrees of phase as the angle is varied by 360 degrees of angle around the base station, wherein N is an integer greater than 1.

17. A method for a second wireless entity to determine a direction toward a first wireless entity, the method comprising:
   a) receiving a first pulse comprising electromagnetic energy, the first pulse transmitted by the first wireless entity;
   b) measuring a received phase of the first pulse as-received by the second wireless entity;
   c) transmitting a reply message to the first wireless entity, the reply message indicating the received phase; and
   d) receiving a data message from the first wireless entity indicating the direction toward the first wireless entity.

18. The method of claim 17, further comprising:
   a) configuring a reception beam of the second wireless entity according to the direction toward the first wireless entity; and
   b) then receiving a subsequent message from the first wireless entity using the reception beam so configured.

19. The method of claim 17, wherein:
   a) the first wireless entity is a base station or access point of a wireless network and the second wireless entity is a user device of the wireless network; and
   b) the first pulse comprises or is concatenated with a system information message transmitted by the first wireless entity.

20. The method of claim 17, further comprising:
   a) receiving a calibration pulse transmitted by the first wireless entity; and
   b) determining a calibration phase of the calibration pulse as received by the second wireless entity;
   c) wherein the measuring the first phase comprises comparing the first phase to the calibration phase.

* * * * *